July 19, 1955     W. D. JEWELL     2,713,270

SUSPENSION FOR GYROSCOPE

Filed Dec. 11, 1953

INVENTOR.
WENDELL D. JEWELL

BY

*Raymond A. Paquin*

ATTORNEY.

United States Patent Office 2,713,270
Patented July 19, 1955

2,713,270

SUSPENSION FOR GYROSCOPE

Wendell D. Jewell, Lynbrook, N. Y., assignor to American Bosch Arma Corporation, a corporation of New York Application December 11, 1953, Serial No. 397,713

4 Claims. (Cl. 74—5.4)

The present invention relates to gyroscope suspension, and has particular reference to a corrugated tape suspension by means of which correcting torques may be applied to a gyro.

The basic operation of a gyro compass employing resilient mechanical connections between the gyro casing and its follow-up members to cause precession of the gyro upon offsetting of the follow up members from the gyro is fully explained in the copending application Serial No. 128,366, filed November 19, 1949, for "Gyroscopic Compass" by Ronald L. Bishop and is not repeated here.

The present invention is an improvement over the means shown in the copending application for the mechanical torsion wire connections between the gyroscope and the follow up member. In each embodiment the major portion of the weight of the gyroscope is supported by immersing the gyroscope casing in neutral flotation in a liquid contained in a tank, which is the follow up member.

One advantage of the invention lies in the elimination of the inner gimbal ring. Another advantage is the elimination of flexes for conducting power to the gyro. Also, the adoption of the present invention permits a more compact design for a desired angular momentum of the gyroscope.

In the present invention a pair of vertically disposed, coplanar corrugated tapes are connected to the gyroscope casing and the inner top of the tank, and a similar pair of tapes are connected between the gyroscope casing and the inner bottom of the tank. The spin axis of the gyroscope is normally perpendicular to the plane of the tapes.

For a better understanding of the invention reference may be had to the accompanying diagrams, in which.

Figure 1:
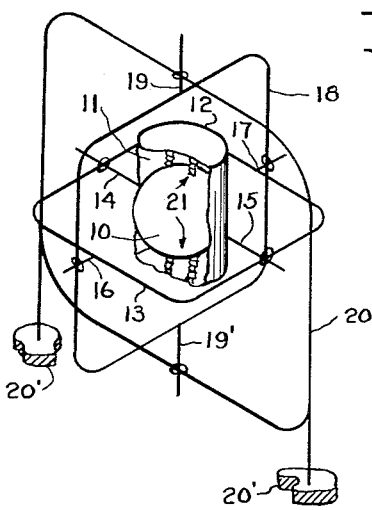
Figure 1 is a schematic diagram of a gyro compass embodying the present invention.

With reference to Figure 1 of the drawings a gyro-compass embodying the present invention is shown schematically. The spherical gyro casing 10 is immersed in a fluid 11, contained within a cylindrical tank 12 which is shown partly broken away to reveal the casing 10, and is suspended in approximate neutral flotation therein. The tank 12 is supported in horizontal gimbal ring 13 by the horizontal shafts 14, 15 and the gimbal ring 13 is, in turn, supported by shafts 16, 17 in the vertical gimbal ring 18. The vertical shafts 19, 19' of gimbal ring 18 are journaled in bearings carried by the support 20, which is secured to the deck 20' of the vehicle in which the compass is carried.

The sphere 10 is connected to the tank 12 by means of the tape suspension 21 which comprises the present invention. By means of this suspension 21 the precessing torques for causing the gyro to settle and remain on the meridian are applied to the gyro in the manner similar to that fully explained in the copending application Serial No. 128,366, filed November 19, 1949, for "Gyroscope Compass" by Ronald L. Bishop. This method consists essentially of displacing the follow up member (tank 12) relatively to the gyro casing 10 about a vertical axis to cause precession of the gyro about a horizontal axis, and about a horizontal axis to cause precession of the gyro in azimuth as a result of the torques applied to the gyro by the tape suspension.

The pendulums, pick-up devices, follow-up motors and damping means have been omitted from Fig. 1 since they are not part of the present invention and their use and necessity in a gyro compass of the type shown will be understood upon reference to the previously mentioned copending patent application.

In addition to the torque applying function, the tape suspension 21 prevents the gyro casing 10 from floating or sinking in the suspending fluid 11.

Figure 2:
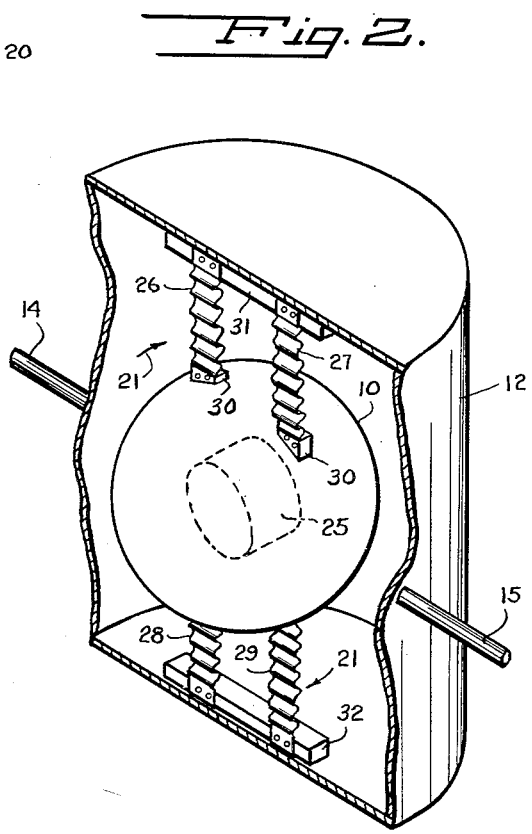
Figure 2 is a pictorial representation of the tapes suspension showing its connection to the gyro and the follow up member.

Figure 2 is a pictorial representation of the tank 12 (in section) showing the sphere 10, in which the gyroscope wheel 25 is mounted, and the ribbon suspension 21 more clearly. The suspension consists of four vertically disposed, co-planar corrugated tapes 26, 27, 28 and 29 which are secured to the gyro casing 10 and the tank 12. The plane of the tapes 26, 27, 28 and 29 is nominally perpendicular to the gyro spin axis, and preferably contains the center of gravity of the gyro 25 and its casing 10.

The inner ends of the tapes 26, 27, 28 and 29 may be fastened to the sphere 10 by any convenient means such as by the connecting blocks 30 shown in Figure 2, for example. The outer ends of the tapes 26, 27, 28 and 29 may be fastened to the tank 12 by means of blocks 31, 32 for example which are connected to the tank 12 and to the tapes 26, 27, 28 and 29, as seen in Fig. 2.

Preferably, one of the blocks 31 or 32 is made adjustable with respect to the tank 12 to provide means whereby the tension in the tapes can be regulated.

Figure 3:
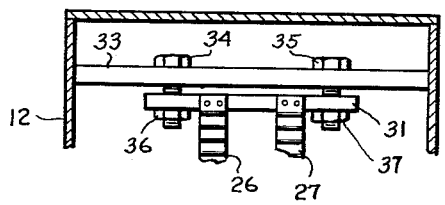
Figure 3 is a schematic view of an arrangement for regulating the tension of the tapes.

One method is shown schematically in Figure 3 in which the block 31 is movable with respect to a bar 33 which is solidly fastened to the tank 12. The block 31 is tapped to receive the adjusting screws 34, 35 which protrude through the bar 33. It will be seen that the block 31 may be positioned closer to or further away from the bar 33 to thereby adjust the tension in the tapes 26, 27, 28 and 29 by rotation of the adjusting screws 34, 35. This is merely an illustrative method for accomplishing the tension adjustment and it is not intended to limit the invention thereto. Lock nuts 36 and 37 are provided for the screws 34, 35 to prevent accidental rotation of the screws.

In operation, when the tank 12 is displaced relatively to sphere 10 about an axis mutually perpendicular to the gyro spin axis and the longitudinal axes of the tapes 26, 27, 28 and 29 (horizontal, in Fig. 2), the tapes are flexed and apply a torque to the gyro 25 such that the gyro undergoes precession about an axis parallel to the tapes (a vertical axis in Fig. 2). When the tank 12 is displaced relatively to sphere 10 about an axis parallel to the tapes 26, 27, 28 and 29 (a vertical axis in Fig. 2), the tapes are twisted and put under a combination of torsional and tensional stress thereby applying a torque to the gyro which causes precession of the gyro spin axis about the axis perpendicular to the longitudinal axis of the tapes (horizontal axis in Fig. 2).

The torque gradients about the horizontal axis should be small for compass application of the gyro suspension 21. For this reason the tapes 26, 27, 28 and 29 are corrugated rather than flat, since the corrugations increase the ability of the tapes to distend under tension or flexure.

The torque gradient about the vertical axis (in Fig. 2) is a function of the spacing of the tapes among other things, and the spacing is chosen to give the desired characteristics of operation.

By properly controlling the degree of displacement between the gyro casing 10 and the tank 12, as by the electrical offset of the follow up tank 12 in the manner fully described in the copending application previously referred to, the gyro spin axis can be made to settle on the meridian in a horizontal position.

If the four tapes 26, 27, 28 and 29 are insulated from each other and from the sphere 10 and tank 12 they will provide means for conducting electrical power between the gyro 25 and the outside of tank 12.

I claim:

1. In a device of the character described, a housing, a gyroscope in said housing, means connecting said gyroscope to said housing for applying torques to said gyroscope upon relative displacement of said housing and gyroscope, said means comprising oppositely disposed pairs of spaced parallel corrugated tapes connected to the housing and gyroscope.

2. In a device of the character described, a housing, a gyroscope in said housing, means connecting said gyroscope to said housing for applying torques to said gyroscope upon relative displacement of said housing and gyroscope, said means comprising oppositely disposed pairs of spaced coplanar corrugated tapes connected to the housing and gyroscope for applying a restoring torque to said gyroscope.

3. In a device of the character described, a housing, a gyroscope in said housing, means connecting said gyroscope to said housing for applying torques to said gyroscope upon relative displacement of said housing and gyroscope, said means comprising oppositely disposed pairs of spaced parallel corrugated tapes connected to the housing and gyroscope, said tapes being disposed in a plane substantially perpendicular to the spin axis of said gyroscope.

4. In a device of the character described, a housing, a gyroscope in said housing, means connecting said gyroscope to said housing for applying torques to said gyroscope upon relative displacement of said housing and gyroscope, said means comprising oppositely disposed pairs of spaced coplanar corrugated tapes connected to the housing and gyroscope for applying a restoring torque to said gyroscope, said tapes being disposed in a plane substantially perpendicular to the spin axis of said gyroscope.

References Cited in the file of this patent

UNITED STATES PATENTS

| | | |
|---|---|---|
| 2,592,582 | Lundberg et al. | Apr. 15, 1952 |
| 2,606,447 | Boltinghouse | Aug. 12, 1952 |
| 2,656,726 | Braddon | Oct. 27, 1953 |

FOREIGN PATENTS

| | | |
|---|---|---|
| 592,099 | Germany | Feb. 1, 1934 |